Oct. 1, 1935.  O. G. BREWER  2,015,882
AUTOMATIC TIRE INFLATER
Filed June 12, 1934
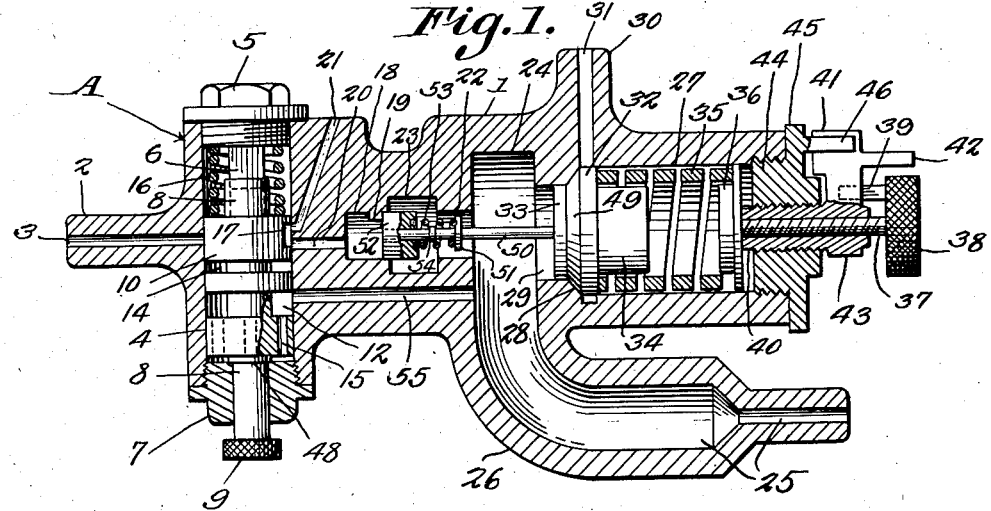
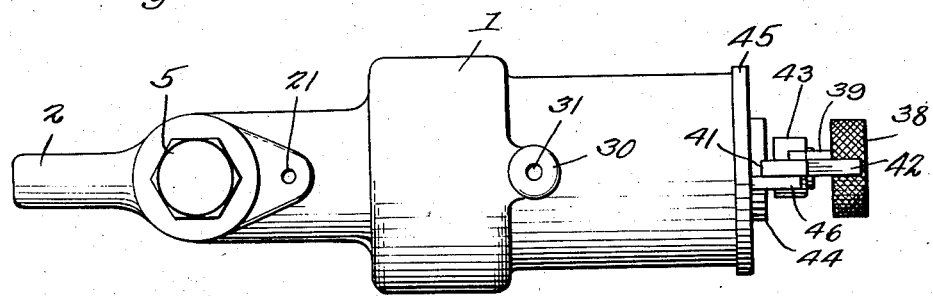
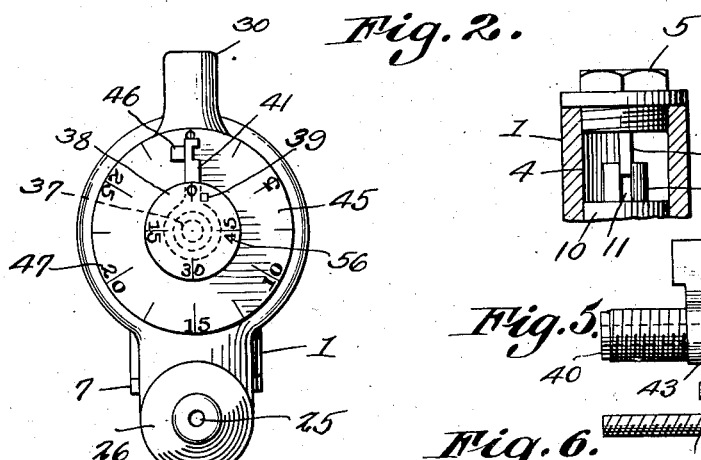
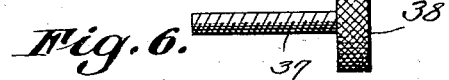
Oscar G. Brewer
Inventor
Attorneys.

Patented Oct. 1, 1935

2,015,882

UNITED STATES PATENT OFFICE 2,015,882

AUTOMATIC TIRE INFLATER

Oscar G. Brewer, St. Marys, Mo.

Application June 12, 1934, Serial No. 730,353

5 Claims. (Cl. 137—153)

This invention aims to provide a novel means whereby the tire on a vehicle wheel may be inflated automatically, or at the will of an operator.

The invention aims to provide a novel combination and arrangement of valves whereby the result above mentioned may be brought about.

Another object of the invention is to provide novel means for adjusting one of the valve springs.

A further object of the invention is to supply novel means whereby the pressure in the tire may be varied, at the will of an operator.

It is within the province of the disclosure to improve generally and to enhance the utility of devices of that type to which the invention pertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawing:

Fig. 1 shows in longitudinal section, a device constructed in accordance with the invention, some parts being in elevation;

Fig. 2 is a plan of the structure shown in Fig. 1;

Fig. 3 is a rear end elevation;

Fig. 4 is a fragmental transverse section showing one of the cylinder heads and attendant parts;

Fig. 5 is an elevation showing one of the adjusting devices for one of the springs;

Fig. 6 is an elevation showing another of the adjusting devices for the spring last above mentioned.

For convenience in locating the parts of the device, relatively to each other, that end of the structure to which the reference character A is applied in Fig. 1 will be considered the forward end.

The article comprises a body 1, supplied at its forward end with an air inlet nipple 2, adapted to be connected to a tank or other source of fluid pressure supply (not shown). The air inlet nipple 2 has a longitudinal bore 3, communicating with the intermediate portion of a transverse cylinder 4, formed in the forward portion of the body 1. The cylinder 4 is closed at one end by a head 5, threaded into the body 1, the head having a flattened, inwardly prolonged projection 6, shown in Fig. 4. The cylinder 4 is closed at its opposite end by a head 7, threaded into the body 1.

A rod or operating member 8 slides in the head 7 and is accessible at its outer end, the outer end of the member 8 carrying a push button 9. Near to its outer end, the rod 8 is provided with a shoulder 48. A first piston valve 10 slides in the cylinder 4 and is secured to the rod 8. The inner portion of the piston valve 10 is adapted to close the bore 3 of the air inlet nipple 2. The inner end of the rod 8 of the piston valve 10 has a slot 11 (Fig. 4), receiving the projection 6 on the head 5. The parts 11 and 6 constitute interengaging elements preventing a rotation of the piston valve 10, as it slides in the cylinder 4. Near to one end, the piston valve 10 has a circumferential chamber or port 12. Inwardly of the port 12, the piston valve 10 has a transverse port 14, which may be a circumferential groove. There is a longitudinal duct 15 in the outer portion of the piston valve 10, establishing communication between the chamber 12 and that part of the cylinder 4 which lies between the outer end of the piston 10 and the head 7. The shoulder 48 on the piston rod 8 is held in engagement with the head 7 by a compression spring 16, interposed between the piston 10 and the head 5, the inner portion of the piston valve 10 closing the bore 3 of the air inlet nipple 2, and the outer end of the piston valve being spaced from the head 7. In the rear edge of the inner part of the piston valve 10 there is a notch 17.

A first valve seat 18 is formed in the body 1, to the rear of the cylinder 4. An abutment 19 projects from the body 1 into the valve seat 18. A small longitudinal bore 20 connects the first valve seat 18 with the cylinder 4. A lateral exhaust port 21 is formed in the body 1, immediately to the rear of the cylinder 4. Both the port 21 and the bore 20 are so located that they communicate with the notch 17 in the piston 10. A second valve seat 22 is formed in the body 1, to the rear of the first valve seat 18. The valve seats 22 and 18 are connected by an enlarged by-pass 23.

A main transverse pressure chamber 24 is fashioned in the body 1, and the valve seat 22 communicates with the pressure chamber. A small longitudinal passage 55 connects the pressure chamber 24 with the cylinder 4 and opens into the chamber 12 of the piston 10. The pressure chamber 24 communicates with the bore 25 of an outwardly and rearwardly extended nipple 26. The nipple 26 is adapted to be connected with the tire (not shown) which is to be inflated.

In the rear part of the body 1, there is a longitudinal second cylinder 27 having a seat 28 at its forward end, the seat and the cylinder 27 communicating at 29 with the main pressure chamber 24. The body 21 is supplied with a side nipple 30, which has a relief port 31, communicating with the cylinder 27. The relief port 31 is adapted to be closed by a second piston valve 32, having a tapered part 49 for engagement with the seat 28, the part 49 having a reduced end 33 that fits in the opening 29 leading to the pressure chamber 24.

On its rear end, the piston valve 32 is supplied with a projection 34, about which is engaged a compression spring 35, abutting at one end against the piston valve 32. The piston valve 32 carries a central longitudinal guide rod 50, provided with an abutment 51. A relief valve 52 slides on the guide 50 and is adapted to engage the abutment 19 on the body 1. The relief valve 52 is adapted to enter and close the first valve seat 18 and the second valve seat 22. A compression spring 53 surrounds a part of the guide rod 50. One end of the spring 53 engages the abutment 51, and the opposite end of the spring engages the valve 52. There is a stop 54 on the guide rod 50, between the abutment 51 and the valve 52.

The rear end of the spring 35 is engaged by a foot 36 on an adjusting device 37, such as a screw, having a turning head 38. The head 38 has a forwardly extended finger 39. The adjusting screw 37 is threaded into a tubular second adjusting device 40. On the outer end of the second adjusting device 40, there is a hub 43 carrying a lateral arm 41 having a rearwardly extended handle 42. The finger 39 on the head 38 of the screw 37 is adapted to be engaged by the arm 41 of the second adjusting device 40.

The second adjusting device 40 is threaded into a closure 44 which, in its turn, is threaded into the body 1, and is fixed therein, at the rear end of the cylinder 27. The closure 44 comprises a disk 45 which bears against the rear end of the body 1. The disk 45 is provided with a rearwardly extended stop 46, adapted to cooperate with the arm 41 on the second adjusting device 40. A circumferential low pressure scale 47 is inscribed on the rear surface of the disk 45. A circumferential high pressure scale 56 is inscribed on the rear surface of the head 38 of the adjusting screw 37.

In practical operation, if the pressure in the tire that is connected to the nipple 26 is not sufficient to advance the first piston valve 10, that valve is advanced manually by the rod 8 and the push button 9, against the action of the spring 16, until the port 14 in the piston valve registers with the bore 3 of the inlet nipple 2 and with the small bore 20 of the body 1. If, however, there is sufficient pressure in the tire, that pressure passes through the bore 25 of the nipple 26, through the passage 55 of the body 1, into the chamber 12 of the piston valve 10, and through the duct 15, into the space between the cylinder head 7 and the outer end of the piston valve, the piston valve being advanced, against the action of the spring 16, until the port 14 registers with the bore 3 of the inlet nipple 2, and with the small bore 20 of the body 1, the exhaust port 21 being closed by the piston valve 10.

The pressure passes from the small bore 20 of the body 1 into the first valve seat 18. The valve 52 is slid back on the guide rod 50, until the valve engages the stop 54 on the guide rod. This opens a conduit comprising the bore 3 of the inlet nipple 2, the port 14 of the piston valve 10, the small bore 20 of the body 1, the valve seat 18, the enlarged by-pass 23, the second valve seat 22, the pressure chamber 24 and the bore 25 of the nipple 26, and air passes into the tire, to inflate the same, the direction of flow of the air being reversed, because the pressure in the bore 3 is greater than the pressure in the bore 25.

When the predetermined pressure has been attained in the tire connected to the nipple 26, the pressure derived through the bore 3 of the inlet nipple 2, the port 14 of the piston valve 10, the bore 20, the seat 18, the by-pass 23, the port 22 and the chamber 24, is transmitted to the second piston valve 32, and that valve moves to the right, opening the relief port 31. As the second piston valve 32 moves to the right, the guide rod 50 and the stop 54 thereon move to the right, and because the valve 52 no longer is backed up by the stop 54, the flowing air, acting by impact, causes the valve 52 to slide to the right on the guide rod 50, and close the valve seat 22, the supply of fluid pressure to the chamber 24 being cut off. The second valve 32 now closes to the left, responsive to the spring 35, but the valve 32 has lag enough so that, before it shuts off the relief port 31, a venting action through the duct 15, the chamber 12 of the first piston 10, the passage 55, the chamber 24 and the relief port 31 takes place. The time interval is so short, and the reduction of pressure is so small considered relatively to the strength of the spring 16, that the loss of pressure in the tire connected to the nipple 26 does not amount to anything in practice. The piston valve 10, responding to the spring 16, now resumes the position of Fig. 1, and closes the fluid pressure inlet 3. As the piston valve 10 resumes the position of Fig. 1, the valve seat 18 is vented through the bore 20, the notch 17 in the first piston valve 10, and the exhaust port 21, and the valve 52 slides to the left on the guide rod 50, into the seat 18, against the abutment 19, under the action of the spring 53. The parts, thus, are restored to the position of Fig. 1.

The pressure derived in the tire connected to the nipple 26 is governed by the strength of the spring 35. The strength of the spring 35 may be regulated, for low pressure, by rotating and advancing the second adjusting device 40, which is threaded into the closure 44. Rotation is imparted manually to the second adjusting device 40, by way of the handle 42, and because the arm 41 on the second adjusting device 40 is in engagement with the finger 39 on the head 38 of the first adjusting device or screw 37, the screw 37 will move with the second adjusting device 40, during the aforesaid rotation thereof. If, however, high pressure is desired, that is, if it is sought to increase the compressive effort of the spring 35, over and above the result secured by rotating the second adjusting device 40, this can be done by rotating the screw 37, by means of the head 38, the foot 36 being advanced accordingly. The scale 47 on the disk 45 of the closure 44, cooperating with the arm 41 on the second adjusting device 40, indicates with sufficient accuracy, the degree of low pressure that has been attained. When the screw or first adjusting device 37 is rotated to secure high pressure adjustment, the dial or scale 56 on the head 38 of the screw, cooperating with the arm 41 on the second adjusting device 40, will give the necessary high pressure reading.

Among other combinations of parts, the device comprises a body 1 provided with a fluid pressure conduit 3—20—18—23—22—24—25, one end 3 of which is an inlet, the opposite end 24—25 of which is an outlet, the body 1 having a relief port 31 communicating with the outlet 24—25, a first valve 10 in the body 1 and interposed in the conduit, adjacent to the inlet 3, spring means 16 for operating the first valve 10 to close the conduit, means 55 for conducting pressure from the outlet 24—25 to the first valve 10, to operate the first valve and open the conduit, a relief valve 52 in the body 1 and located in the conduit, between the first valve 10 and the outlet 24—25, spring means 53 for seating the relief valve 52 toward the first valve 10, thereby enabling pressure to pass through the conducting means 55 and open the first valve 10, the relief valve 52 opening away from the first valve 10, responsive to pressure admitted to the conduit by the opening of the first valve 10, another valve 32 in the body 1, spring means 35 for operating said other valve 32 to cause it to close the relief port 31, said other valve 32 responding to a predetermined pressure in the outlet 24—25, to open the relief port 31, the relief valve 52 seating toward the outlet 24—25 as the pressure fluid flows through the conduit from the inlet 3 to the outlet 24—25, and means 50—54 carried by said other valve 32 for holding the relief valve 52 against seating toward the outlet 24—25, until said other valve 32 has moved to open the relief port 31.

Having thus described the invention, what is claimed is:

1. In a device for inflating vehicle tires, a body provided with a fluid pressure conduit, one end of which is an inlet, the opposite end of which is an outlet, the body having a relief port communicating with the outlet, a first valve in the body and interposed in the conduit, adjacent to the inlet, spring means for operating the first valve to close the conduit, means for conducting pressure from the outlet to the first valve, to operate the first valve and open the conduit, a relief valve in the body and located in the conduit, between the first valve and the outlet, spring means for seating the relief valve toward the first valve, thereby enabling pressure to pass through the conducting means and open the first valve, the relief valve opening away from the first valve, responsive to pressure admitted to the conduit by the opening of the first valve, another valve in the body, spring means for operating said other valve to cause it to close the relief port, said other valve responding to a predetermined pressure in the outlet, to open the relief port, the relief valve seating toward the outlet as the pressure fluid flows through the conduit from the inlet to the outlet, and means carried by said other valve for holding the relief valve against seating toward the outlet until said other valve has moved to open the relief port.

2. A device for inflating vehicle tires, constructed as set forth in claim 1, and further characterized by the provision of means under the control of an operator for actuating the first valve to cause it to open the conduit.

3. A device for inflating vehicle tires, constructed as set forth in claim 1, and further characterized by the fact that the body has an exhaust port communicating with that part of the conduit which lies between the first valve and the relief valve, the first valve closing the exhaust port when the first valve is in position to open the conduit, the first valve having means for opening the exhaust port when the first valve is in position to close the conduit.

4. A device for inflating vehicle tires, constructed as set forth in claim 1, and wherein the means carried by said other valve for holding the relief valve against seating toward the outlet until said other valve has moved to open the relief port, is a guiding stem on said other valve, the relief valve being slidable upon the guiding stem, and the guiding stem having a stop which the relief valve engages, as the relief valve moves toward the outlet, and while said other valve is in closed relation with respect to the relief port.

5. A device for inflating vehicle tires, constructed as set forth in claim 1, in combination with mechanism for adjusting the spring means for operating said other valve, said mechanism comprising an outer member threaded into the body, an inner member threaded into the outer member and provided with a foot engaging said spring means, and interengaging parts on the inner and outer members, whereby, when the outer member is rotated, the inner member will be rotated also, said interengaging parts having a separable relation with respect to each other, whereby the inner member may be rotated independently of the outer member.

OSCAR G. BREWER.